United States Patent [19]

Tanimoto et al.

[11] Patent Number: 4,591,797
[45] Date of Patent: May 27, 1986

[54] PSK DEMODULATOR HAVING AN AFC CIRCUIT

[75] Inventors: Yoshio Tanimoto; Masaaki Atobe, both of Tokyo, Japan

[73] Assignee: NEC Corporation, Japan

[21] Appl. No.: 714,377

[22] Filed: Mar. 21, 1985

[30] Foreign Application Priority Data

Mar. 28, 1984 [JP] Japan .................................. 59-59818

[51] Int. Cl.⁴ ........................ H03D 3/02; H04L 27/22
[52] U.S. Cl. .................................... 329/50; 329/122; 375/80; 375/81; 375/83
[58] Field of Search ......................... 329/50, 122, 124; 375/80, 81, 83, 120

[56] References Cited

U.S. PATENT DOCUMENTS 4,313,219 1/1982 Gabler et al. .................. 329/122 X
4,361,894 11/1982 Kurihara et al. .............. 329/122 X Primary Examiner—Siegfried H. Grimm
Attorney, Agent, or Firm—Ostrolenk, Faber, Gerb & Soffen

[57] ABSTRACT

A PSK demodulator is disclosed. The demodulator includes a voltage controlled oscillator response to a control circuit in a frequency converter for converting an input PSK signal as a function of the output of the voltage controlled oscillator. A carrier recovery circuit recovers a carrier wave from the output of the frequency converter means and applies the recovered output to a band-pass filter. A phase detector detects the output of the frequency converter as a function of the output of the band-pass filter and provides a demodulated signal and function thereof. A phase comparator is provided for detecting the phase difference between the input and output signals of the band-pass filter and a low-pass filter responsive to the output of the phase comparator provides the control signal.

3 Claims, 5 Drawing Figures

PSK DEMODULATOR HAVING AN AFC CIRCUIT

BACKGROUND OF THE INVENTION

The present invention relates to a PSK (Phase Shift Keying) demodulator, and more particularly to a PSK demodulator having an automatic frequency control (AFC) circuit for stabilizing the recovered carrier.

In a conventional PSK demodulator of this type, the carrier wave is recovered from an input modulated wave consisting of, for example, an N (N=2, 4, ...) phase PSK wave, by a carrier recovery circuit. The recovered carrier wave is stabilized by an AFC circuit, and is applied to a phase detector (or coherent detector) which also receives the input modulated wave form and which processes the two signals to derive as an output the demodulated signal. There are two versions of the carrier recovery circuit: one of frequency multiplier type usually comprising an N frequency multiplier, a band-pass filter (BPF) and a 1/N frequency divider, and the other of inverse modulator type usually comprising a delay circuit and an N phase modulator.

The AFC circuit in such a demodulator, though working on the recovered carrier wave, does not correct phase errors that may result from frequency fluctuations in the circuits outside the AFC circuit loop, such as errors which appear in the BPF or delay circuit of the carrier recovery circuit described above. Therefore, in a transmission system where the carrier frequency of the input modulated wave fluctuates greatly, there can arise significant performance deterioration of the demodulator owing to the phase errors occurring outside the AFC circuit loop.

SUMMARY OF THE INVENTION

An object of the present invention is to provide a PSK demodulator essentially unaffected by frequency fluctuations of the input modulated waves.

According to the invention, there is provided a PSK demodulator comprising: voltage controlled oscillator means responsive to a control signal; frequency converter means for frequency converting an input PSK signal with the output of the voltage controlled oscillator means; carrier recovery circuit means for recovering a carrier wave from the output of the frequency converter means; band-pass filter means receiving the carrier wave; phase detector means for phase detecting the output of the frequency converter means with the output of said band-pass filter means and providing a demodulated signal; phase comparator means for detecting the phase difference between the input and output signals of the band-pass filter means; and low-pass filter means responsive to the output of the phase comparator means for providing the control signal.

BRIEF DESCRIPTION OF THE DRAWINGS

For the purpose of illustrating the invention, there is shown in the drawings one embodiment which is presently preferred, it being understood, however that this invention is not limited to the precise arrangements and instrumentalities shown.

DETAILED DESCRIPTION OF THE INVENTION

Figure 1:
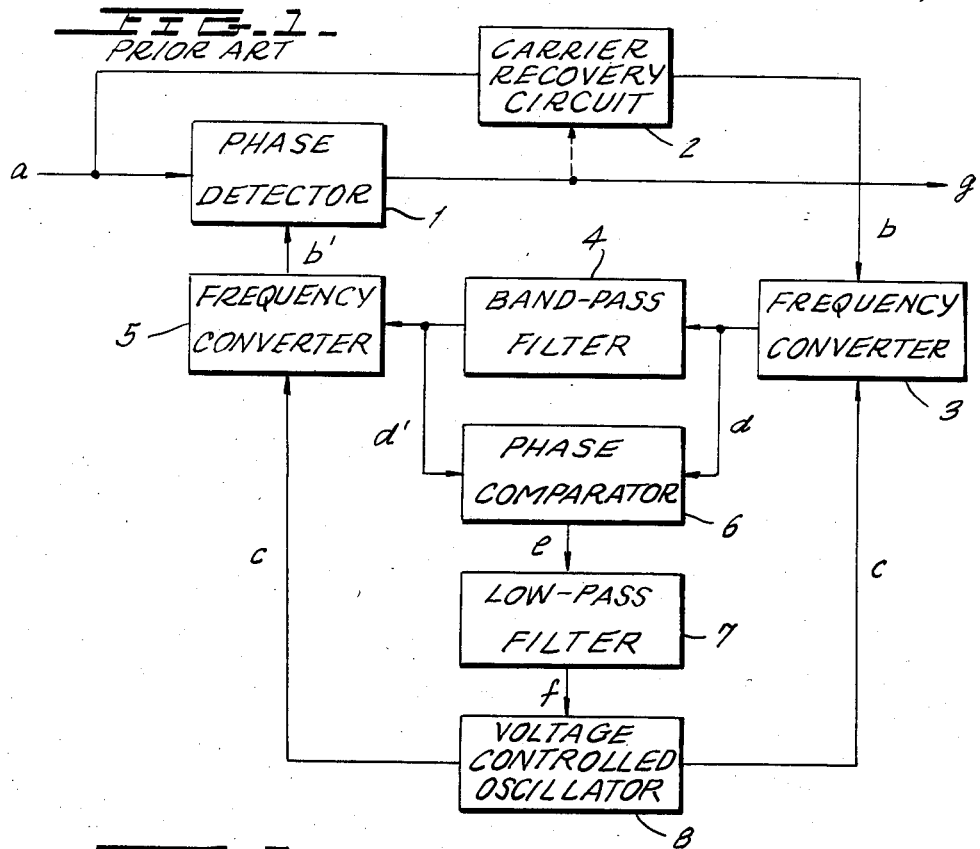
FIG. 1 is a block diagram of a conventional PSK demodulator.

Referring now to the drawings wherein like numerals indicate like elements, there is shown in FIG. 1 a block diagram of a typical prior art PSK demodulator using an AFC circuit. The demodulator includes a phase detector (or coherent detector) 1, a carrier recovery circuit 2, a first frequency converter 3, a band-pass filter (BPF) 4, a second frequency converter 5, a phase comparator 6, a low-pass filter (LPF) 7, and a voltage-controlled oscillator 8. The AFC loop circuit comprises the frequency converters 3 and 5, the BPF 4, the phase comparator 6, the LPF 7 and the oscillator 8.

Figure 2:
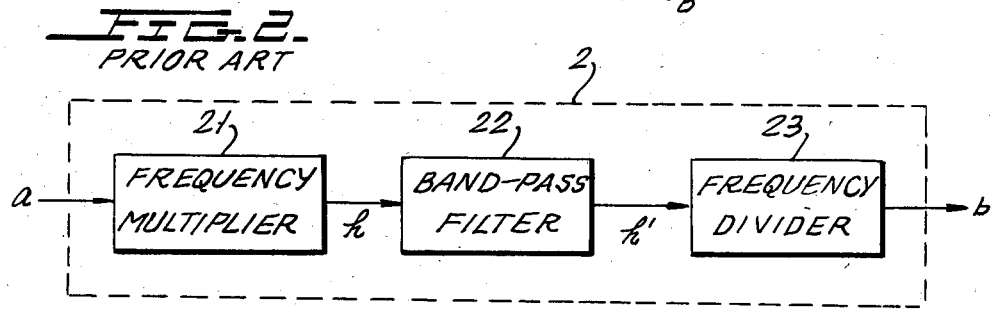
FIG. 2 is a block diagram of the carrier recovery circuit illustrated in FIG. 1.
Figure 3:
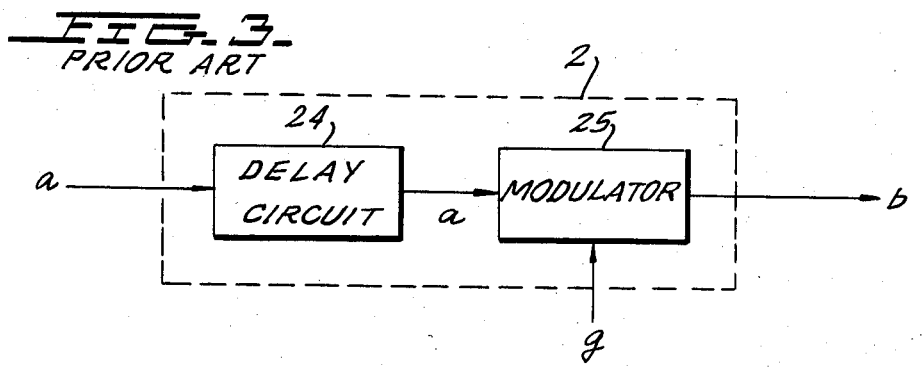
FIG. 3 is another block diagram of the carrier recovery circuit illustrated in FIG. 1.

The carrier recovery circuit 2 recovers a carrier wave b from an input modulated carrier wave a. Examples of the structure of the carrier recovery circuit 2 are shown in FIGS. 2 and 3 which respectively illustrate a multiplier type system and an inverse modulator type system, wherein 2 (=N) phase modulation is assumed for the sake of brevity of description. Referring to FIG. 2, the input modulated carrier wave (or 2-phase PSK wave) a is frequency-multiplied by 2 (=N) in a frequency multiplier 21, and thereby converted into a signal h having double the frequency of the carrier wave. This signal h of the output of the frequency multiplier 21 is supplied through a band-pass filter 22 to a frequency divider 23, which frequency divides the band-passed signal h' by $\frac{1}{2}$ (=1/N) with the result that the carrier wave b appears at the output of the carrier recovery circuit 2.

In the inverse modulator system of FIG. 3, on the other hand, the modulated signal a, after being delayed in a delay circuit 24 by the detection time of the phase detector 1, is entered into a 2-phase PSK modulator 25, which inversely phases-modulates the delayed modulated signal with the output demodulated signal g of the phase detector 1 and thereby recovers the carrier wave b.

Figure 4:
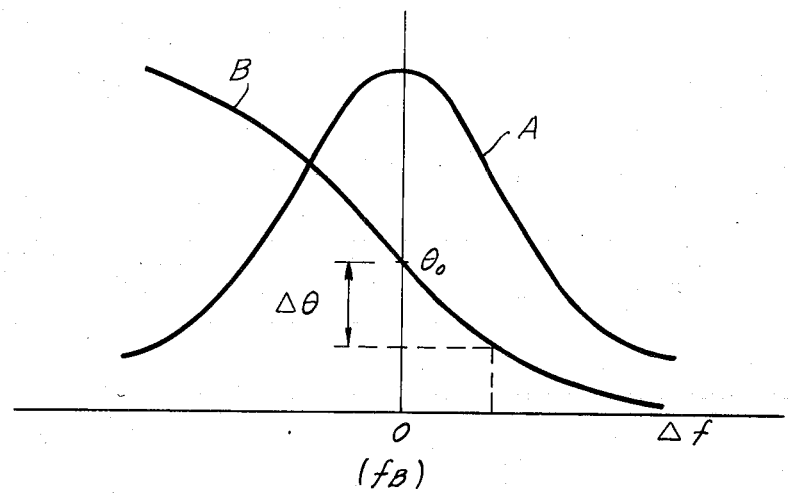
FIG. 4 is a diagram of the amplitude-phase characteristics of the band-pass filter shown in FIG. 1.

To improve the signal/noise power ratio of the recovered carrier b, the BPF 4 shown in FIG. 1 has an extremely narrow bandwidth. The typical characteristics of the BPF 4 are illustrated in FIG. 4, wherein A represents the amplitude-frequency characteristic and B, the phase-frequency characteristic. If the input frequency of the BPF deviates by $\Delta f$ from the center frequency fB of the BPF, its output phase will vary by $\Delta \theta$ because of the phase characteristic of the BPF. Also, even where the input frequency is constant, if the center frequency fB varies due to temperature changes or aging, the output phase will vary. Thus, since such a variation in output phase would substantially deteriorate the phase detection performance, the BPF 4 is usually provided with an AFC loop circuit (3, 5 and 6 to 8) shown in FIG. 1.

In the AFC loop circuit, the carrier wave b, after being frequency-converter by the frequency converter 3 with an output signal c of the oscillator 8 and coupled to the BPF 4 to undergo band limitation, is again frequency-converted into the original carrier frequency by the frequency converter 5 by the output signal c of the oscillator 8. Herein, the relationship among the carrier frequency fC, the oscillation frequency fV of the oscillator 8 and the center frequency fB of the BPF 4 can be represented by the following equation:

$$fC \pm fV = fB \tag{1}$$

Then, a detection voltage e proportional to the phase difference between an input signal d to and an output signal d' from the BPF 4 is outputted from the phase comparator 6 and, becomes a control signal f to the oscillator 8 after being properly band-limited by the LPF 7. The control signal f controls the oscillation frequency fV of the oscillator 8 in such a manner that the input/output phase difference of the BPF 4 tends to be reduced to zero. Thus, because the AFC loop circuit always functions so as to reduce the input/output phase fluctuations of the BPF 4 to zero, irrespective of the fluctuations of the input carrier frequency fC or of the center frequency fB of the BPF 4, the phase of the recovered carrier wave b' is always kept constant, making possible stable coherent-detection of the PSK signal a applied to the phase detector 1.

The disadvantage of the prior art PSK demodulator described above lies in the fact that the AFC loop operates on only the recovered carrier signals. Accordingly, if the frequencies of signals outside the AFC loop vary (i.e. variations occurring in the received signal or in the carrier recovery circuit) with the variations in the input frequency of the demodulator which has a band-limiting factor or delaying factor outside the AFC loop, nothing can be done to correct the resultant phase errors. For example, in the frequency multiplier system, phase errors will occur due to the phase characteristic of the BPF 22 shown in FIG. 2, or in the inverse modulator system, there will be phase errors attributable to the delay circuit 24 in FIG. 3.

These values can be represented by the following equations:

$$\theta e = \theta 1 + \theta 2 \tag{2}$$

$$\theta 1 = (KB' + 2\pi\tau)\Delta fc: \text{ Outside the AC loop} \tag{3}$$

$$\theta 2 = \frac{K_B}{1 + K} \cdot \Delta fc: \text{ Inside the AC loop} \tag{4}$$

where fc is the input frequency variation, K is the gain of the AFC loop, $K_B$ is the phase sensitivity (rad/Hz) of the BPF 4, KB' is the phase sensitivity (rad/Hz) of the band limiting factor outside the AFC loop, and $\tau$ is the delay time (sec) of the delaying factor outside the AFC loop.

In a transmission system where the fluctuations of the input carrier frequency are particularly great, the performance deterioration of the demodulator attributable to the phase errors outside the AFC loop will reach significant magnitudes.

Figure 5:
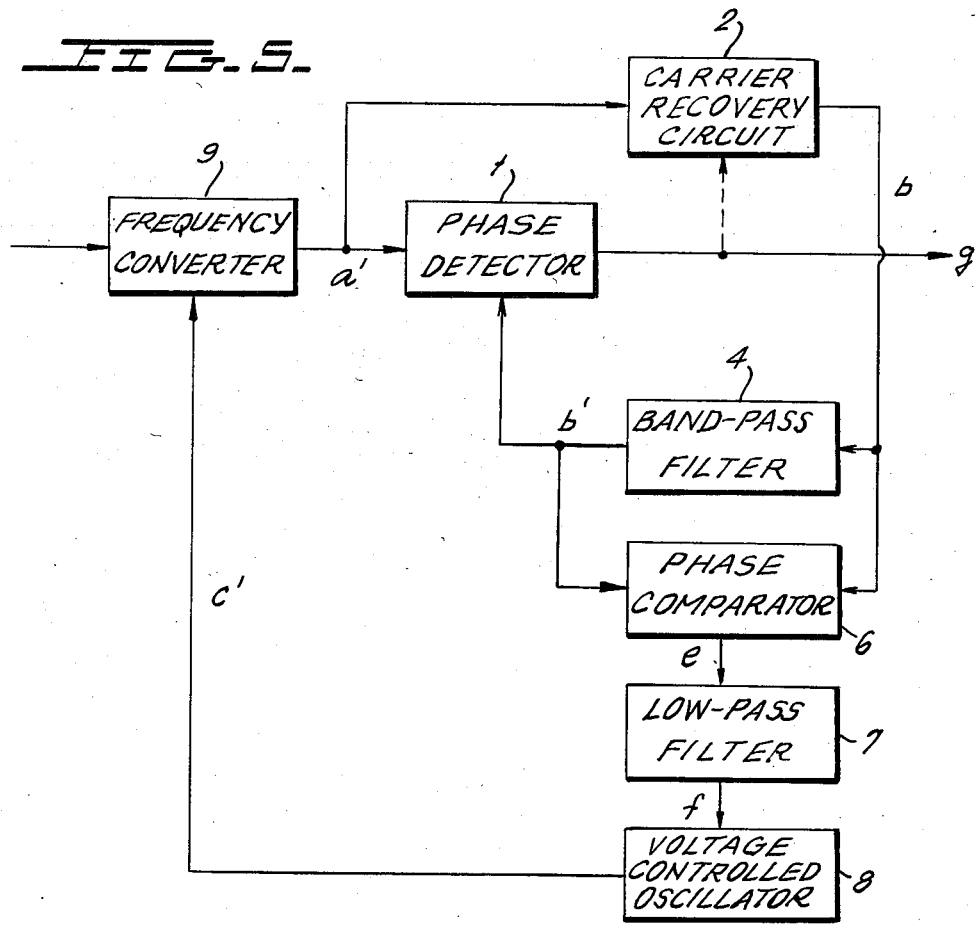
FIG. 5 is a block diagram of a PSK demodulator according to the present invention.

FIG. 5 is a block diagram of a PSK demodulator according to the present invention, free from the above described disadvantage and essentially unaffected by fluctuations in input frequency. The reference numerals therein represent respectively the same constituent elements as in FIG. 1 except for a frequency converter 9.

Next will be described how this demodulator operates. An input modulated signal a is frequency-converted by the frequency converter 9 as a function of the output signal c' of the voltage-controlled oscillator 8. Equation (1) above holds true with the invention. Thus the carrier frequency fC' of converted modulated signal a' is the same as the center frequency fB of the BPF 4.

The carrier wave b is recovered by a carrier recovery circuit 2 from the converted modulated signal a'. This carrier wave b, undergoes improvement in its signal/noise power ratio operation of the BPF 4, and is then applied to the phase detector 1 as a recovered carrier wave b'. At this time, the phase comparator 6 detects the input/output phase difference of the BPF 4, supplies a detection signal 3, properly band-limited by the LPF 7, as a control signal f to the oscillator 8, and controls the frequency of the output signal c' of the oscillator 8 so that the input/output phase difference of the BPF 4 is reduced to zero. Thus the AFC loop so functions that the carrier frequency fC' of the converted demodulated signal a' is always equal to the center frequency fB of the BPF 4 irrespective of the fluctuation of the carrier frequency fC of the input modulated signal a. Since in practice the loop gain K is finite, there is a deviation ΔfB of the converted carrier frequency fC' from the center frequency fB of the BPF 4, the input frequency fluctuation being represented by ΔfC. The value of ΔfB can be represented by:

$$\Delta fB = \Delta fc/(1+K) \tag{6}$$

Thus the fluctuation of the converted carrier frequency is substantially compressed by the gain of the AFC loop. As a result, the overall phase error $\theta e$, as represented correspondingly to Equations (2) to (4), will be:

$$\theta e = \theta 1 + \theta 2$$

$$\theta 1 = (K_B + \pi\tau)\frac{\Delta fc}{1 + K} \tag{7}$$

$$\theta 2 = \frac{K_B}{1 + K} \cdot \Delta fC \tag{8}$$

Thus the phase error in Equation (7) is greatly reduced by the loop again, compared with that in Equation (3).

As is evident from the foregoing description, the PSK demodulator according to the present invention, utilizes a frequency converter provided at the input of the demodulator as part of the AFC loop. This frequency converter absorbs all the input frequency fluctuations to fully solve the problem, inherent with conventional demodulators, of phase errors occurring outside the AFC loop owing to input frequency fluctuations. The resultant improved demodulator features a wide-band carrier recovery performance characteristic.

Although a preferred embodiment of the present invention has been described in detail by way of illustration only, many modifications and variations thereof will now be apparent to one skilled in the art, and, accordingly, the scope of this invention is to be limited not by the details of the preferred embodiment described herein, but only by the appended claims.

What is claimed is:

1. A PSK demodulator comprising: voltage controlled oscillator means responsive to a control signal; frequency converter means for frequency converting an input PSK signal as a function of the output of said voltage controlled oscillator means; carrier recovery circuit means for recovering a carrier wave from the output of said frequency converter means; band-pass filter means receiving said recovered carrier wave; phase detector means for phase detecting the output of said frequency converter means as a function of the output of said band-pass filter means and providing a demodulated signal; phase comparator means for detecting the phase difference between the input and output signals of said band-pass filter means; and low-pass filter means responsive to the output of said phase comparator means for providing said control signal.

2. A PSK demodulator as claimed in claim 1, wherein said carrier recovery circuit means comprises a frequency multiplier for frequency multiplying the output of said frequency converter means, a band-pass filter for band-limiting the output of said frequency multiplier, and a frequency divider for frequency dividing the output of said band-pass filter and providing said carrier wave.

3. A PSK demodulator as claimed in claim 1, wherein said carrier recovery circuit comprises a delay circuit for delaying the output of said frequency converter means, and a PSK modulator for modulating the output of said delay circuit with said demodulated signal.

* * * * *